US012327506B2

(12) United States Patent
Hsieh et al.

(10) Patent No.: US 12,327,506 B2
(45) Date of Patent: Jun. 10, 2025

(54) SUBSTRATE STRUCTURE

(71) Applicant: InnoLux Corporation, Miao-Li County (TW)

(72) Inventors: Ming-Feng Hsieh, Miao-Li County (TW); Chan-Feng Chiu, Miao-Li County (TW); Chien-Hung Chan, Miao-Li County (TW); Hsiao-Lan Su, Miao-Li County (TW); Meng-Chang Tsai, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 18/503,196

(22) Filed: Nov. 7, 2023

(65) Prior Publication Data

US 2024/0185754 A1 Jun. 6, 2024

Related U.S. Application Data

(60) Provisional application No. 63/430,353, filed on Dec. 6, 2022.

(30) Foreign Application Priority Data

Aug. 31, 2023 (CN) .......................... 202311110926.1

(51) Int. Cl.
*G09G 3/20* (2006.01)

(52) U.S. Cl.
CPC ... *G09G 3/2003* (2013.01); *G09G 2300/0426* (2013.01); *G09G 2300/0809* (2013.01)

(58) Field of Classification Search
CPC ......... G09G 3/2003; G09G 2300/0426; G09G 2300/0809
See application file for complete search history.

(56) References Cited

U.S. PATENT DOCUMENTS

| | | | | |
|---|---|---|---|---|
| 10,109,245 | B2 | 10/2018 | Zeng | |
| 2005/0116905 | A1 * | 6/2005 | Kim | H10K 59/121 345/76 |
| 2021/0056924 | A1 | 2/2021 | Xiao | |
| 2022/0328595 | A1 * | 10/2022 | Li | H10K 59/131 |

FOREIGN PATENT DOCUMENTS

| | | | | |
|---|---|---|---|---|
| CN | 110456585 | | 11/2019 | |
| DE | 4016177 | * | 6/2022 | G02F 1/1362 |
| EP | 4016177 A1 | | 6/2022 | |
| KR | 20200100915 A | * | 8/2020 | H10K 59/131 |

* cited by examiner

*Primary Examiner* — Towfiq Elahi
(74) *Attorney, Agent, or Firm* — Winston Hsu

(57) ABSTRACT

The present disclosure provides a substrate structure including a substrate, a first electrode, a second electrode, a first signal line, and a second signal line. The substrate includes a functional region and a peripheral region, and the peripheral region is adjacent to the functional region. The first electrode and the second electrode are disposed on the substrate and arranged along a first direction. The first signal line and the second signal line are arranged on the substrate and along the first direction and extend along a second direction perpendicular to the first direction. The first signal line is electrically connected to the first electrode, and the second signal line is electrically connected to the second electrode. The first signal line and the second signal line are electrically connected to each other in the peripheral region.

17 Claims, 8 Drawing Sheets

FIG. 3
SDR
ST1 : RRRRRRRR....
ST2 : GGGGGGGG....
ST3 : BBBBBBBB....
ST4 : RRRRRRRR....
ST5 : GGGGGGGG....
ST6 : BBBBBBBB....

FIG. 5
BK
SDR
SDL1 : RBBRRBBR....
SDL2 : GRRGGRRG....
SDL3 : GRRGGRRG....
SDL4 : BGGBBGGB....
SDL5 : BGGBBGGB....
SDL6 : RBBRRBBR....
SDL7 : RBBRRBBR....
SDL8 : GRRGGRRG....

FIG. 7
SDR
SDL1 : RRRRRRRR....
SDL2 : GGGGGGGG....
SDL3 : BBBBBBBB....
SDL4 : RRRRRRRR....
SDL5 : GGGGGGGG....
SDL6 : BBBBBBBB....
SDL7 : RRRRRRRR....
SDL8 : GGGGGGGG....

SUBSTRATE STRUCTURE

CROSS REFERENCE TO RELATED APPLICATION

This application claims the benefit of U.S. Provisional Application No. 63/430,353, filed on Dec. 6, 2022. The content of the application is incorporated herein by reference.

BACKGROUND OF THE DISCLOSURE

1. Field of the Disclosure

The present disclosure relates to a substrate structure and particularly to a substrate structure of an electronic device.

2. Description of the Prior Art

As displays are widely used, dual-gate driving technology has been developed to share a data line by two adjacent sub-pixel columns, so as to reduce the number of data lines. Accordingly, number of data driver can be decreased, and cost of the display can be reduced. However, when voltage levels of a data signal on the same data line need to be switched to correspond to sub-pixels of different color, insufficient voltage level charged by the data signal easily occurs, which leads to a difference between a color generated from a sub-pixel and a desired color. In other words, the voltage levels of the data signal corresponding to three different colors will affect each other, so as to generate color mix, for example generate color shift, color deviation in different regions of display panel, granular dark points and other image defects. Therefore, to reduce the image defects to improve the image quality is an objective in this art.

SUMMARY OF THE DISCLOSURE

It is an objective of the present disclosure to provide a substrate structure.

An embodiment of the present disclosure provides a substrate structure including a substrate, a first electrode, a second electrode, a first signal line, and a second signal line. The substrate includes a functional region and a peripheral region, and the peripheral region is adjacent to the functional region. The first electrode and the second electrode are disposed on the substrate and arranged along a first direction. The first signal line and the second signal line are arranged on the substrate and along the first direction and extend along a second direction perpendicular to the first direction. The first signal line is electrically connected to the first electrode, and the second signal line is electrically connected to the second electrode. The first signal line and the second signal line are electrically connected to each other in the peripheral region.

Another embodiment of the present disclosure provides a substrate structure including a substrate, a first electrode, a second electrode, a third electrode, and a first signal line. The first electrode, the third electrode, and the second electrode are disposed on the substrate and arranged along a first direction. The first signal line is disposed on the substrate and extends along a second direction perpendicular to the first direction, and the first signal line is electrically connected to the first electrode and the second electrode. The first electrode and the second electrode are disposed on different sides of the first signal line, and the third electrode is disposed between the second electrode and the first signal line.

These and other objectives of the present disclosure will no doubt become obvious to those of ordinary skill in the art after reading the following detailed description of the embodiment that is illustrated in the various figures and drawings.

DETAILED DESCRIPTION

Figure 1:
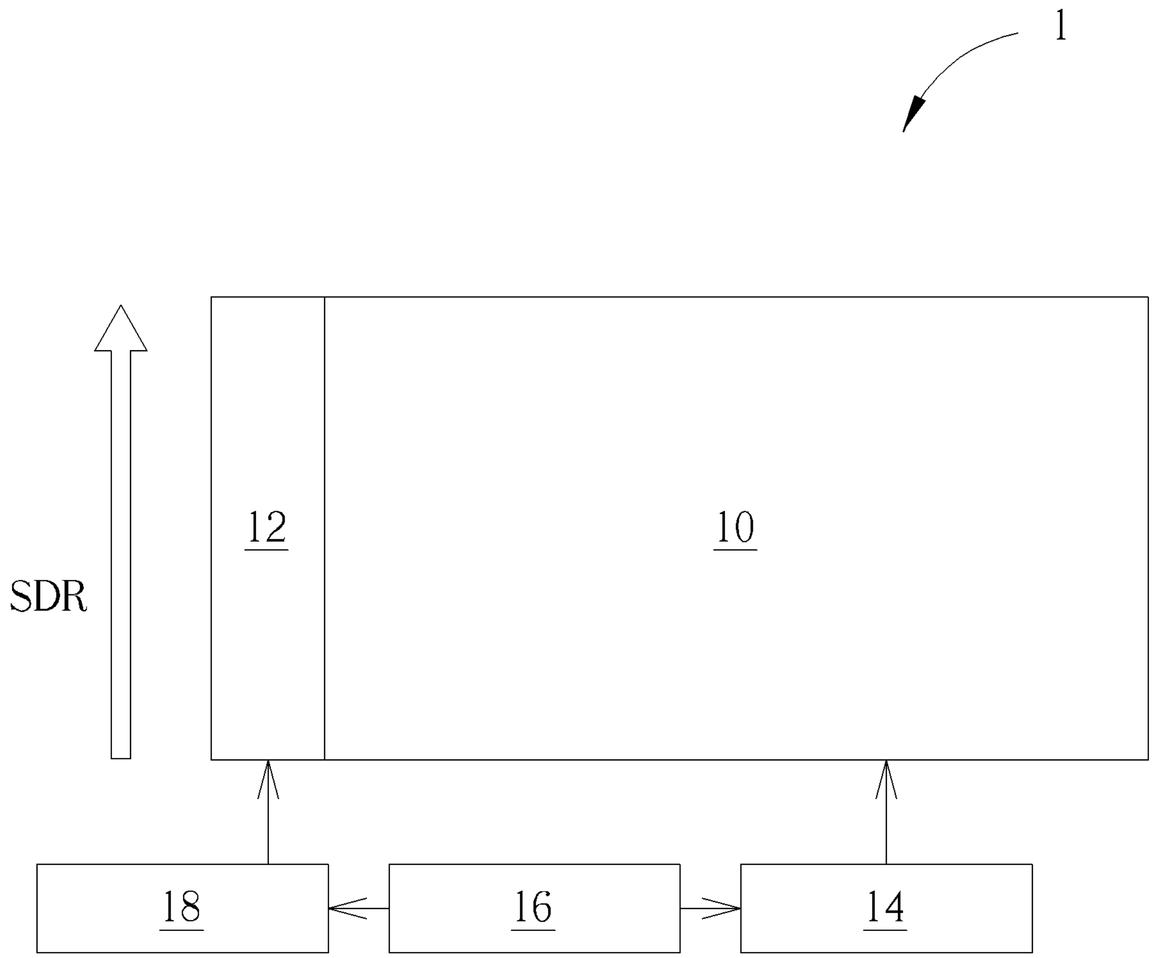
FIG. 1 schematically illustrates a driving system of a display device according to some embodiments of the present disclosure.

The contents of the present disclosure will be described in detail with reference to specific embodiments and drawings. It is noted that, for purposes of illustrative clarity and being easily understood by the readers, the following drawings may be simplified schematic diagrams, and elements therein may not be drawn to scale. The numbers and sizes of the elements in the drawings are just illustrative and are not intended to limit the scope of the present disclosure.

Certain terms are used throughout the specification and the appended claims of the present disclosure to refer to specific elements. Those skilled in the art should understand that electronic equipment manufacturers may refer to an element by different names, and this document does not intend to distinguish between elements that differ in name but not function. In the following description and claims, the terms “comprise”, “include” and “have” are open-ended fashion, so they should be interpreted as “including but not limited to . . . ”.

The ordinal numbers used in the specification and the appended claims, such as “first”, “second”, etc., are used to describe the elements of the claims. It does not mean that the element has any previous ordinal numbers, nor does it represent the order of a certain element and another element, or the sequence in a manufacturing method. These ordinal numbers are just used to make a claimed element with a certain name be clearly distinguishable from another claimed element with the same name.

In addition, when one element or layer is “electrically connected to” the another element or layer, it may be understood that the element or layer is directly electrically connected to the another element or layer, and alternatively, the element or layer may be (indirectly) electrically connected to the another element or layer through another element or layer. On the contrary, when the element or layer is "directly electrically connected to" the another element or layer, it may be understood that they are electrically connected to each other without through another element or layer. Also, the term "electrically connected" or "coupled" includes means of direct or indirect electrical connection.

As disclosed herein, the terms "approximately", "essentially", "about", or "substantially" generally mean within 20%, 10%, 5%, 3%, 2%, 1%, or 0.5% of the reported numerical value or range. The quantity disclosed herein is an approximate quantity, that is, without a specific description of "approximately", "essentially", "about", or "substantially", the quantity may still include the meaning of "approximately", "essentially", "about", or "substantially".

It should be understood that according to the following embodiments, features of different embodiments may be replaced, recombined or mixed to constitute other embodiments without departing from the spirit of the present disclosure. The features of various embodiments may be mixed arbitrarily and used in different embodiments without departing from the spirit of the present disclosure or conflicting.

Unless otherwise defined, all terms (including technical and scientific terms) used herein have the same meaning as commonly understood by those skilled in the art. It should be understood that these terms, such as those defined in commonly used dictionaries, should be interpreted as having meaning consistent with the relevant technology and the background or context of the present disclosure, and should not be interpreted in an idealized or excessively formal way, unless there is a special definition in the embodiments of the present disclosure.

An electronic device of the present disclosure may, include but is not limited to a display device, a light emitting device, a sensing device, an antenna device, a touch device, a tiled device or other suitable devices. The electronic device may, for example, be a bendable, stretchable, foldable, rollable and/or flexible electronic device but is not limited thereto. The display device may, for example, be applied to a laptop, a public display, a tiled display, a vehicle display, a touch display, a television, a monitor, a smartphone, a tablet, a light source module, a lighting device, military equipment or an electronic device applied to the above product but is not limited thereto. The sensing device may for example be used for detecting changes in capacitances, light, heat or ultrasound, but is not limited thereto. The sensing device may, for example, include a biosensor, a touch sensor, a fingerprint sensor, other suitable sensors or any combination of sensors mentioned above. The display device may, for example, include liquid crystal molecules, light emitting diodes, a fluorescent material, a phosphor material, other suitable display mediums, or any combination thereof, but is not limited thereto. The light emitting diode may, for example, include an organic light emitting diode (OLED), a mini light emitting diode (mini-LED) or a micro light emitting diode (micro LED), a quantum dot light emitting diode (e.g., QLED or QDLED), other suitable elements or any combination of elements mentioned above. The antenna device may, for example, include liquid crystal antenna, varactor diode antenna or antennas of other types, but is not limited thereto. The tiled device may, for example, include a tiled display device or a tiled antenna device, but is not limited thereto. Furthermore, the appearance of the electronic device may be rectangular, circular, polygonal, a shape with curved edges, curved or other suitable shapes, but not limited thereto. The electronic device may have peripheral systems such as a driving system, a control system, a light source system, a shelf system, etc. The electronic device may include electronic units, in which the electronic units may include a passive element and an active element, and for example include a capacitor, a resistor, an inductor, a diode, a transistor, a sensor, etc. It is noted that the electronic device of the present disclosure may be any combination of the above-mentioned devices, but is not limited thereto. The display device is as an example of the electronic device to be described in the following content and drawings, but the electronic device of the present disclosure is not limited thereto.

Refer to FIG. 1, which schematically illustrates a driving system of a display device according to some embodiments of the present disclosure. As shown in FIG. 1, the display device 1 may include a display panel 10, at least one gate driver 12, and at least one data driver 14. The display panel 10 may be any type of self-luminous or non-self-luminous display panel. For example, the display panel 10 may be a liquid crystal display panel, a light-emitting diode display panel, an organic light-emitting diode display panel, or other suitable display panels. The display panel 10 mentioned herein takes a non-self-luminous display panel as an example, but is not limited thereto. The gate driver 12 may be electrically connected to scan lines (or called gate lines) of the display panel 10 to provide scan signals to the scan lines of the display panel 10 to control the switching of sub-pixels in the display panel 10. The data driver 14 may be electrically connected to data lines of the display panel 10 to provide data signals to the data lines of the display panel, and the data signals may change voltage levels with turn-on time of the scan signals, such that the display panel 10 may display images according to the data signals. The data driver 14 may, for example, include a driver chip or other suitable driver. The gate driver 12 may, for example, include a gate driver on array (GOA), a gate driver chip or other suitable driver. The present disclosure is not limited to this.

In this embodiment, the display device 1 may further include a timing controller 16, which may be electrically connected to the data driver 14 and the gate driver 12, respectively. The timing controller 16 may be used to control timings of the scan signals and the data signals, such that a specific voltage level in one of the data signals may match the corresponding scan signal. In FIG. 1, the display device 1 may further include a level shifter 18, and the timing controller 16 may be electrically connected to the gate driver 12 through the level shifter 18 to adjust voltage levels of the scan signals through the level shifter 18, but the present disclosure is not limited to this.

Figure 2A:
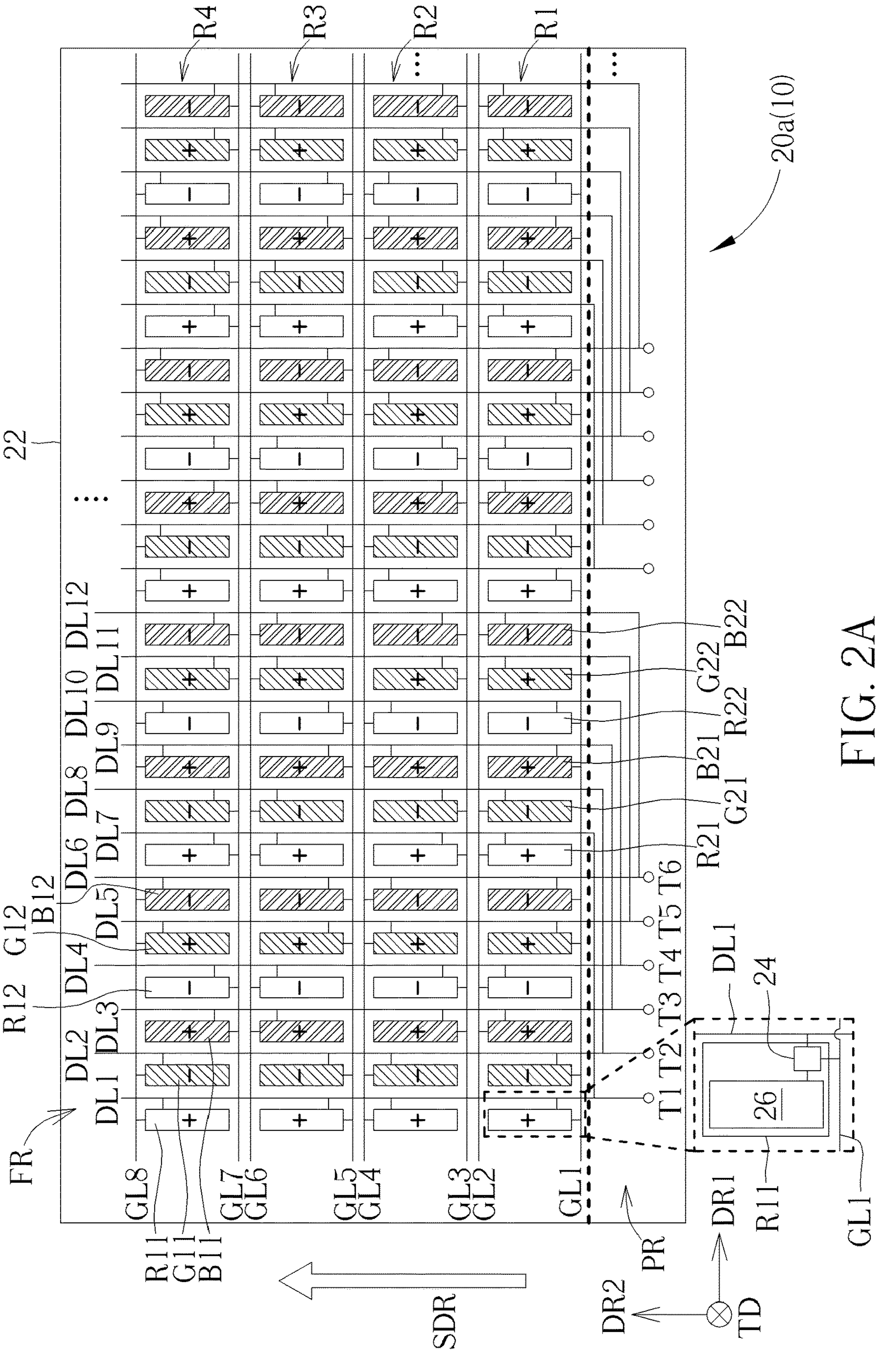
FIG. 2A schematically illustrates a top view of the display panel according to a first embodiment of the present disclosure.

Refer to FIG. 2A, which schematically illustrates a top view of the display panel according to a first embodiment of the present disclosure. As shown in FIG. 2A, the display panel 10 may include a substrate structure **20*a*. For example, when the display panel 10 is a liquid crystal display panel, the substrate structure 20*a*** may be used as one of substrate structures of the liquid crystal display panel, such as an array substrate, but is not limited thereto.

In this embodiment, the substrate structure **20*a* may include a substrate 22, a first electrode, a second electrode, a first signal line, and a second signal line. The substrate 22 may include a functional region FR and a peripheral region PR, in which the peripheral region PR is adjacent to the functional region FR. In one embodiment, the peripheral region PR may surround the functional region FR, but the present disclosure is not limited thereto. For example, the functional region FR may correspond to a display region of the display panel 10 used for displaying images or other suitable regions. The peripheral region PR may correspond to, for example, a region where peripheral circuits are disposed. The first electrode and the second electrode may be disposed on the substrate 22 and arranged along a first direction DR1. The first signal line and the second signal line may be arranged on the substrate 22 along the first direction DR1 and extend along a second direction DR2 perpendicular to the first direction DR1, in which the first signal line may be electrically connected to the first electrode, and the second signal line may be electrically connected to the second electrode. Furthermore, the first signal line and the second signal line may be electrically connected to each other in the peripheral region PR. In another embodiment, the first signal line and the second signal line may be directly electrically connected to each other in the peripheral region PR. It is noted that through the electrical connection of the first signal line and the second signal line in the peripheral region PR, the first signal line and the second signal line may be electrically connected to the same output channel of the data driver (e.g., the data driver 14 shown in FIG. 1), such as one of output channel T1 to output channel T6**. Accordingly, the number of the output channels of the data driver may be reduced, or the number of the used data driver may be decreased, thereby reducing manufacturing costs and/or energy losses.

Specifically, as shown in FIG. 2A, the display panel 10 may include a plurality of sub-pixels arranged in an array, but not limited thereto. As an example, the sub-pixels may include a plurality of first sub-pixels (e.g., a sub-pixel R11, a sub-pixel R12, a sub-pixel R21 and a sub-pixel R22), a plurality of second sub-pixels (e.g., a sub-pixel B11, a sub-pixel B12, a sub-pixel B21 and a sub-pixel B22) and a plurality of third sub-pixels (e.g., a sub-pixel G11, a sub-pixel G12, a sub-pixel G21 and a sub-pixel G22), in which the first sub-pixels, the second sub-pixels and the third sub-pixels are respectively used for providing light of a first color, light of a second color and light of a third color, and the first color, the second color and the third color may be different from each other, such that light generated by the sub-pixels may form an image. For example, the first color, the second color and the third color may be red, blue and green, respectively, but are not limited thereto. Light of different colors may be generated from self-luminous electronic units (e.g., organic light-emitting diodes or inorganic light-emitting diodes) or a non-self-luminous electronic device (e.g., light generated by backlight module passing through the liquid crystal display panel). One of the first sub-pixels, one of the second sub-pixels and one of the third sub-pixels adjacent to one another may form a pixel, and for example, the sub-pixel R11, the sub-pixel G11 and the sub-pixel B11 may form a pixel.

In FIG. 2A, all the sub-pixels in the same column may be the first sub-pixels, the second sub-pixels or the third sub-pixels, so the first sub-pixels, the second sub-pixels or the third sub-pixels may be arranged in different columns. For example, the sub-pixel R11, the sub-pixel R12, the sub-pixel R21, the sub-pixel R22, the sub-pixel G11, the sub-pixel G12, the sub-pixel G21, the sub-pixel G22, the sub-pixel B11, the sub-pixel B12, the sub-pixel B21, and the sub-pixel B22 are respectively arranged in different columns. In the sub-pixels of the same row, the first sub-pixels, the second sub-pixels and the third sub-pixels may be arranged alternately in sequence along the row direction. For example, the sub-pixel R11, the sub-pixel G11, the sub-pixel B11, the sub-pixel R12, the sub-pixel G12, the sub-pixel B12, the sub-pixel R21, the sub-pixel G21, the sub-pixel B21, the sub-pixel R22, the sub-pixel G22, and the sub-pixel B22 are respectively arranged in the same row. In FIG. 2A, the row direction and the column direction may be, for example, the first direction DR1 and the second direction DR2 respectively, but are not limited thereto.

As shown in a lower part of FIG. 2A, a portion of each sub-pixel (e.g., the sub-pixel R11) in the substrate structure 20*a* may include a switching element 24 and an electrode 26 disposed on the substrate 22, and the electrode 26 is electrically connected to the switching element 24. Herein, the electrode 26 takes a pixel electrode of a sub-pixel as an example, but is not limited thereto. The electrode 26 may include, for example, a transparent conductive material or an opaque conductive material and may be adjusted according to types of the display panel 10. The switching element 24 may be used to control whether to transmit the data signal to electrode 26. The switching element 24 may include, for example, a transistor, a thin film transistor, or other suitable element. In some embodiments, the sub-pixel may further include elements disposed outside the substrate structure 20*a*, or other elements of the sub-pixel in the substrate structure 20*a*, which is not limited to that shown in FIG. 2A, and may include other suitable elements. In following contents, as viewed from a top view direction TD, each sub-pixel may be defined as a region formed by two adjacent scan lines and two adjacent data lines and include a region of the corresponding switching element 24 and the corresponding electrode 26, but is not limited thereto.

As shown in FIG. 2A, the substrate structure 20*a* may further include a plurality of signal lines disposed on the substrate 22. The signal lines may include, for example, a plurality of data lines and a plurality of scan lines, in which the data lines are used for transmitting data signals, and the scan lines are used for transmitting scan signals. The data lines may be arranged on the substrate 22 along the first direction DR1 and extend along the second direction DR2, and the scan lines may be arranged along the second direction DR2 and extend along the first direction DR1. The scan lines cross the data lines and are electrically insulated from the data lines. The scan lines and the data lines may be formed of different metal layers, for example. The scan lines and the data lines may be electrically connected to the electrodes 26 of the corresponding sub-pixels through the corresponding switching elements. In detail, one of the scan signals transmitted by one of the scan lines may control the corresponding switching element 24, so that one of the data signals on one of the data lines may be transmitted to the corresponding electrode 26 through the corresponding switching element. A position of one of the sub-pixels may, for example, be defined to be adjacent to an intersection of one of the data lines and one of the scan lines as viewed from the top view direction TD. In addition, the data line DL1 to the data line DL12 are as an example of the data lines, and the scan line GL1 to the scan line GL8 are as an example of the scan lines in the following contents, but are not limited thereto. In some embodiments, the number of the data lines and the number of the scan lines may be adjusted according to resolution of the display panel 10 and are not limited to that shown in FIG. 2A.

In the embodiment of FIG. 2A, when viewed along the top view direction TD of the display panel 10, the sub-pixel columns and the data lines may be alternately arranged along the first direction DR1. Each data line may be electrically connected to a corresponding column of sub-pixels. For example, the data line DL1 may be electrically connected to the electrodes 26 of the sub-pixels R11 in the same column, the data line DL2 may be electrically connected to the electrodes 26 of the sub-pixels G11 in the same column, the data line DL3 may be electrically connected to the electrodes 26 of the sub-pixel B11 in the same column, and so on. The data line DL4 to the data line DL12 may be electrically connected to the electrodes 26 of the corresponding columns of sub-pixels respectively.

As shown in FIG. 2A, the data line DL1 may be directly electrically connected to the data line DL7 in the peripheral region PR and be electrically insulated from other data lines; the data line DL2 may be directly electrically connected to the data line DL8 in the peripheral region PR and be electrically insulated from other data lines; the data line DL3 may be directly electrically connected to the data line DL9 in the peripheral region PR and be electrically insulated from other data lines; and so on. In other words, starting from a left side of the substrate 22, the (n)th data line may be directly electrically connected to the (n+6)th data line, where the value of n and the value of (n+6) do not overlap, that is, n may be 1 to 6, 13 to 19, etc. For example, two of the data lines directly electrically connected to each other may be the above-mentioned first signal line and second signal line respectively, and the electrodes of the sub-pixels electrically connected to the (n) th data line and the (n+6) th data line in the same sub-pixel row may be the above-mentioned first electrode and second electrode respectively but are not limited thereto. In some embodiments, the data line DL1 and the data line DL7 may be electrically connected to each other in the peripheral region PR through a layer bridging structure (e.g., another conductor of another layer different from the data lines) and may be electrically insulated from other data lines. In this case, although the data line DL1 is not directly electrically connected to the data line DL7, they may still be electrically conducted and transmit signals between them. By analogy, each pair of the data line DL2 and the data line DL8, the data line DL3 and the data line DL9, etc., may be electrically connected to each other through a layer bridging structure to transmit signals, but the present disclosure is not limited thereto.

In addition, in order to electrically connect the (n+6) th data line with the (n) th data line, the (n+6)th data signal may cross the data lines between the (n)th data line and the (n)th data line in the peripheral region PR and be electrically insulated from them. In some embodiments, the (n+6)th data line and the (n)th data line may be electrically connected, for example, through a connecting line, and the connecting line and the data lines may be formed of different conductive layers, but are not limited thereto.

In FIG. 2A, the (n) th data line and the (n+6)th data line may be electrically connected to the electrodes 26 of the sub-pixel columns for providing light of the same color respectively, between which the electrodes of at least one of the sub-pixel columns are disposed. For example, the data line DL1 and the data line DL7 may be electrically connected to the electrodes 26 of a column of the sub-pixels R11 and the electrodes 26 of a column of the sub-pixels R21 for providing light of the same first color respectively. The data lines DL2 and DL8 may be electrically connected to the electrodes 26 of a column of the sub-pixels G11 and the electrodes 26 of a column of the sub-pixels G21 for providing light of the same third color respectively. The data line DL3 and the data line DL9 may be electrically connected to the electrodes 26 of a column of the sub-pixels B**1*l* and the electrodes 26 of a column of the sub-pixels B21** for providing light of the same second color light, and so on.

Furthermore, the data line DL1 and the data line DL7 may be electrically connected to the output channel T1 of the data driver (e.g., the data driver 14 shown in FIG. 1). The data line DL2 and the data line DL8 may be electrically connected to the output channel T2 of the data driver 14. The data line DL3 and the data line DL9 may be electrically connected to the output channel T3 of the data driver 14, and so on. The data line DL4, the data line DL5, and the data line DL6 may be electrically connected to the output channel T4, the output channel T5, and the output channel T6 of the data driver 14 respectively. It should be noted that although the number of the data lines of the substrate structure **20*a* may be the same as the number of the sub-pixel columns, the number of the output channels of the data driver 14 may be reduced by electrically connecting two of the data lines. In other words, the number of the output channels of the data driver 14 may be different from the number of the data lines. For example, the number of the output channels of the data driver 14** may be less than the number of the data lines.

In some embodiments, the data line DL1 may be not limited to be electrically connected to the seventh data line DL7 from the left side of the substrate 22, but may be electrically connected to another one of the data lines corresponding to the sub-pixels for providing light of the same color as the sub-pixels corresponding to the data line DL1. As an example, the (n) th data line may be electrically connected to the (n+m) th data line, where m may be adjusted according to requirements. For example, m may be 3 or other suitable values, and n may be adjusted based on the value of m, such that the value of n and the value of (n+m) do not overlap. Moreover, the number of the sub-pixel columns and the output channels may also be adjusted based on m.

As shown in FIG. 2A, two adjacent scan lines may form a scan line pair, and the electrodes 26 of the sub-pixels in the same row may be disposed between the two adjacent scan lines of the same scan line pair and may be electrically connected to the two adjacent scan lines through the corresponding switching elements 24, respectively. For example, a sub-pixel row R1, a sub-pixel row R2, a sub-pixel row R3, and a sub-pixel row R4 may be respectively disposed between the scan line GL1 and the scan line GL2, between the scan line GL3 and the scan line GL4, between the scan line GL5 and the scan line GL6, between the scan line GL7 and the scan line GL8. Taking the scan line GL1 and the scan line GL2 as an example, in the sub-pixel row R1, the scan line GL1 may be electrically connected to the electrode 26 of the sub-pixel R11 and the electrode 26 of the sub-pixel G11 respectively through the corresponding switching elements 24, and the scan line GL2 may be electrically connected to the electrode 26 of the sub-pixel B**1*l* and the electrode 26 of the sub-pixel R12 respectively through the corresponding switching elements 24. In this embodiment, an electrical connection structure of the sub-pixel row R2 and the corresponding scan line pair may be symmetrical to the electrical connection structure of the sub-pixel row R1 and the corresponding scan line pair with respect to the scan line GL2 (or the scan line GL3) extending along the first direction DR1. For example, in the sub-pixel row R2, the sub-pixel R11 and the sub-pixel G11 may be electrically connected to the same scan line GL4, and the sub-pixel B1*l* and the sub-pixel R12 may be electrically connected to the same scan line GL3. By analogy, an electrical connection structure of the sub-pixel row R3 and the corresponding scan line pair (i.e., the scan line GL5 and the scan line GL6) may be the same as the electrical connection structure of the sub-pixel row R1 and the corresponding scan line pair, and an electrical connection structure of the sub-pixel row R4 and the corresponding scan line pair (i.e., the scan line GL7 and the scan line GL8) may be the same as the electrical connection structure of the sub-pixel row R2 and the corresponding scan line pair. Therefore, in the same sub-pixel row, two adjacent sub-pixels and other two adjacent sub-pixels may be alternately electrically connected to the corresponding scan lines, respectively. In some embodiments, electrical connection structures of other sub-pixel rows (e.g., the sub-pixel row R2, the sub-pixel row R3, and the sub-pixel row R4) and the corresponding scan line pairs (e.g., the scan line GL3 and the scan line GL4, the scan line GL5 and the scan line GL6, and the scan line GL7 and the scan line GL8) may be the same as the electrical connection structure of the sub-pixel row R1** and the corresponding scan line pair.

Since the data line DL1 and the data line DL7 are electrically connected to each other, the data signal transmitted from the output channel T1 may be transmitted to the data line DL1 and the data line DL7 at the same time. In this embodiment, since the switching element 24 of the sub-pixel R11 and the switching element 24 of the sub-pixel R21 are electrically connected to different scan line GL1 and scan line GL2, respectively, the switching element 24 of the sub-pixel R11 and the switching element 24 of the sub-pixel R21 may be turned on at different times, such that the voltage levels of the data signal of the output channel T1 at different times may be transmitted to the electrode 26 of the sub-pixel R11 via the switching element 24 of the sub-pixel R11 and transmitted to the electrode 26 of the sub-pixel R21 via the switching element 24 of the sub-pixel R21, respectively.

In addition, since the electrodes 26 of the sub-pixels in the same column may be electrically connected to the same data line, and the adjacent sub-pixels in the same column (e.g., the sub-pixels R11 in the sub-pixel row R1 and the sub-pixel row R2) provide light of the same color, vertical resolution of the display panel 10 may be optionally reduced by providing the same scan signal to two scan lines electrically connected to the adjacent sub-pixels (e.g., the adjacent sub-pixels R11). For example, the vertical resolution of the display panel 10 may be reduced by half. In this case, when turn-on time of each scan signal remains unchanged, time for displaying a frame may be shortened, thereby increasing frame rate of the display panel 10, for example, doubling the frame rate. Alternatively, when the time for display a frame remains unchanged, the turn-on time of each scan signal may be increased, thereby increasing charging time of the data signal and reducing the image defects. In one embodiment, the scan line GL1 and the scan line GL4 may transmit the same scan signal, and the scan signal GL2 and the scan signal GL3 may transmit the same scan signal, such that the sub-pixel row R1 and the sub-pixel row R2 may be combined to form the same sub-pixel row, thereby reducing the vertical resolution of the display panel 10.

Figure 3:
FIG. 3 schematically illustrates a color timing of the data signal according to the first embodiment of the present disclosure.

Refer to FIG. 3, which schematically illustrates a color timing of the data signal according to the first embodiment of the present disclosure. As shown in FIG. 2A and FIG. 3, the output channel T1 to the output channel T6 of the data driver may respectively provide a data signal ST1, a data signal ST2, a data signal ST3, a data signal ST4, a data signal ST5, and a data signal ST6. Since the sub-pixel R11 electrically connected to the data line DL1 and the sub-pixel R21 electrically connected to the data line DL7 are used to provide light of the same first color R, the voltage levels of the data signal ST1 at different times correspond to the sub-pixels for providing the first color R, and the data signal ST1 has no voltage levels corresponding to different colors need to be switched. For example, an order of turning on the scan lines may be along a scanning direction SDR (which may turn on the scan line GL1, the scan line GL2, the scan line GL3, and the scan line GL4 in sequence). In the timing of the data signal ST1, the voltage levels corresponding to the first color R may be sequentially provided to the sub-pixel R11 of the sub-pixel row R1, the sub-pixel R21 of the sub-pixel row R1, the sub-pixel R21 of the sub-pixel row R2, the sub-pixel R11 of the sub-pixel row R2, etc., so that the order of providing the data signal ST1 from the output channel T1 to the sub-pixels R11 and sub-pixels R21 may be, for example, in a serpentine shape, but is not limited thereto. Similarly, the voltage levels of the data signal ST2 at different times correspond to the sub-pixels for providing light of the third color G, and the data signal ST2 has no voltage levels corresponding to different colors need to be switched. The voltage levels of the data signal ST3 at different times correspond to the sub-pixels for providing light of the second color B, and the data signal ST3 has no voltage levels corresponding to different colors need to be switched. By analogy, the data line DL4 to the data line DL12 have no voltage levels corresponding to different colors need to be switched. In other words, starting from the left side of the substrate 22, the sub-pixels electrically connected to the (n) th data line and the sub-pixels electrically connected to the (n+6)th data line may be used for providing light of the same color, so that the voltage levels of the data signal corresponding to different scan signals may correspond to sub-pixels for providing light of the same color. In some embodiments, when the electrical connection structures of the sub-pixel rows and the corresponding scan line pair are the same as each other, the order of turning on the scan lines may be along the scanning direction SDR (which may turn on the scan line GL1, the scan line GL2, the scan line GL4, and the scan line GL3 in sequence), the output channel T1 may provide the data signal ST1 sequentially to the sub-pixel R11 of the sub-pixel row R1, the sub-pixel R21 of the sub-pixel row R1, the sub-pixel R11 of the sub-pixel row R2, the sub-pixel R21 of the sub-pixel row R2, etc., such that the order of providing the data signal ST1 to the sub-pixels R11 and the sub-pixels R21 may, for example, be in a zigzag shape, but is not limited thereto. In this case, the voltage levels of the data signal ST1 at different times may still correspond to the sub-pixels for providing light of the first color R. Similarly, the data signal ST2, the data signal ST3, the data signal ST4, the data signal ST5, and the data signal ST6 may also provide voltages to the corresponding sub-pixels in a zigzag-shaped order.

It should be noted that since adjacent sub-pixels for providing light of the same color in the same image may have similar grayscale values, the required voltage levels will also be similar. In this way, by electrically connecting the data line DL1 electrically connected to the sub-pixels R11 with the data line DL7 electrically connected to the sub-pixel R21, the adjacent voltage levels of the data signal ST1 provided by the output channel T1 may be less likely to change significantly (or have significant difference between them), thereby reducing the image defects. Alternatively, a product value (time constant) of resistance and capacitance corresponding to the data line DL1 and the data line DL7 may be lightened, which is to reduce the influence of the resistances of the data line DL1 and the data line DL7 on the image quality. Similarly, the adjacent voltage levels of other data signals (e.g., the data signal ST2 to the data signal ST6) may also be less likely to change significantly, so as to reduce the image defects.

In this embodiment, the electrode 26 of the sub-pixel R11 electrically connected to the data line DL1 may receive a first signal (e.g., a signal of the voltage level corresponding to a first one of the first colors R shown in FIG. 3) from the data line DL1, and the electrode 26 of the sub-pixel R21 electrically connected to the data line DL7 may receive a second signal (e.g., a signal of the voltage level corresponding to a second one of the first colors R shown in FIG. 3) from the data line DL7, in which a polarity of the first signal may be may be the same as a polarity of the second signal. For example, the sub-pixel R11 and the sub-pixel R21 shown in FIG. 2A both have positive polarities +. Furthermore, in the sub-pixels of the same column (e.g., sub-pixel R11), signals received by adjacent electrodes 26 may also have the same polarities. For example, the electrode 26 of the sub-pixel R11 of the sub-pixel row R1 may receive a first signal, and the electrode 26 of the sub-pixel R11 of the sub-pixel row R2 may receive another first signal, in which the polarities of the two first signals may be the same as each other. Since the first signal and the second signal provided by the same output channel T1 may have the same polarity, a difference between the voltage levels of the data signals is small, such that there is no significant change in polarity inversion, thereby reducing image defects. In the present disclosure, the polarity is a comparison between a voltage of the data signal and a common voltage. In other words, the positive polarity means that the voltage of the data signal is greater than the common voltage, and a negative polarity means that the voltage of the data signal is less than the common voltage. By analogy, the data signal transmitted by the data line DL2 and the data signal transmitted by the data line DL8 may have the same polarities, such as the negative polarities—of the sub-pixel G11 and the sub-pixel G21 shown in FIG. 2A. The data signal transmitted by the data line DL3 and the data signal transmitted by the data line DL9 may have the same polarities, such as the positive polarities + of the sub-pixel B11 and the sub-pixel B21 shown in FIG. 2A. When the display panel 10 is driven by the above data signals, the polarities of the sub-pixels of the display panel 10 may be driven in a row inversion manner, but is not limited to this. In some embodiments, the positive polarities + and negative polarities—of FIG. 2A may be interchangeable with each other.

Figure 2B:
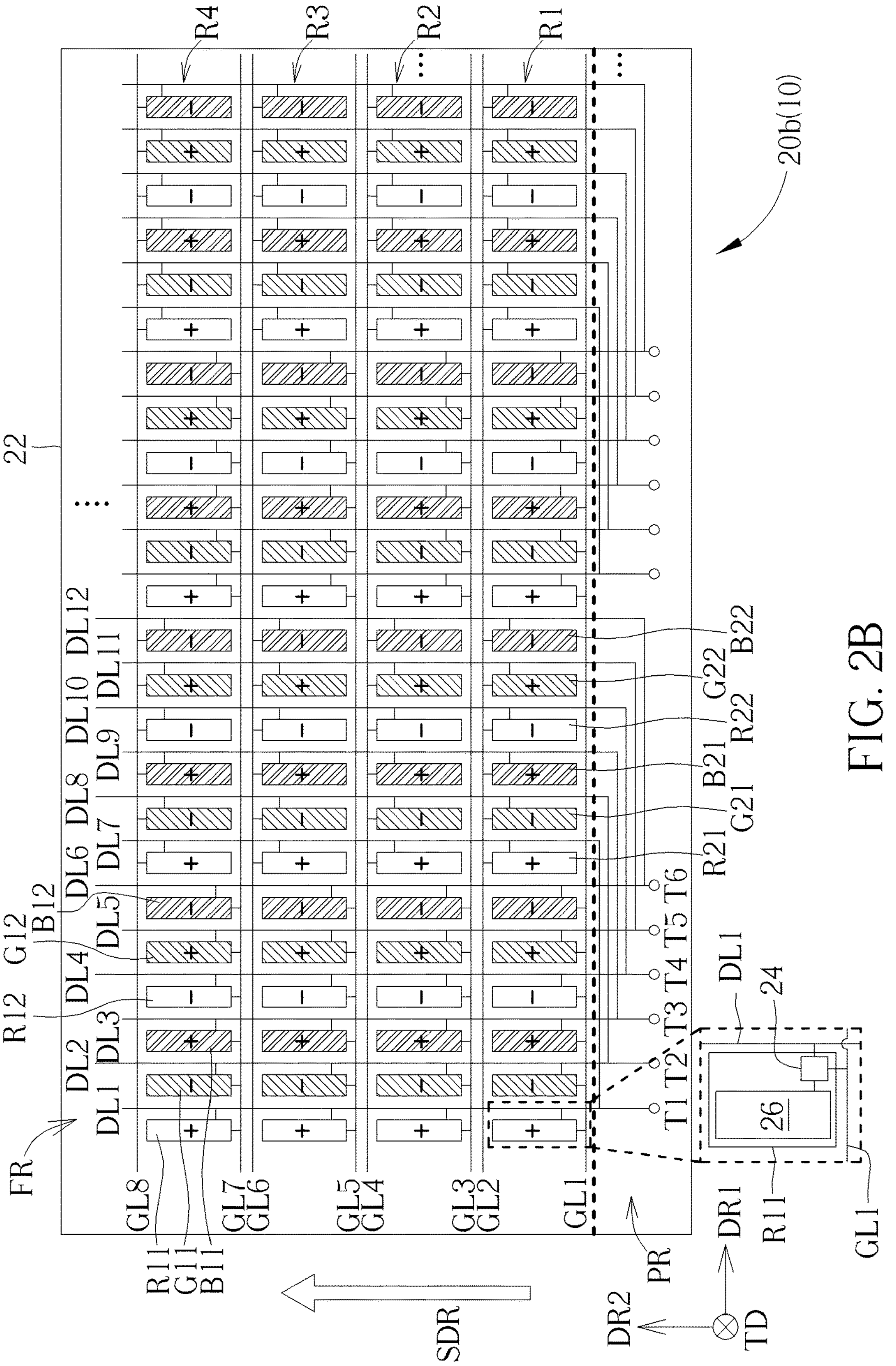
FIG. 2B schematically illustrates a top view of a display panel according to a variant embodiment of the first embodiment of the present disclosure.

In the same sub-pixel row, two adjacent sub-pixels and other two adjacent sub-pixels may be not limited to be alternately electrically connected to the corresponding two scan lines. Refer to FIG. 2B, which schematically illustrates a top view of a display panel according to a variant embodiment of the first embodiment of the present disclosure. As shown in FIG. 2B, in the same sub-pixel row of the substrate structure 20*b* provided in this variant embodiment, taking the sub-pixel row R1 as an example, the electrodes 26 of the sub-pixel R11, the sub-pixel G11, the sub-pixel B11, the sub-pixel R12, the sub-pixel G12, and the sub-pixel B12 may be electrically connected to the scan line GL1 respectively through the corresponding switch elements 24, and the electrodes 26 of the sub-pixel R21, the sub-pixel G21, the sub-pixel B21, the sub-pixel R22, the sub-pixel G22, and the sub-pixel B22 may be electrically connected to the scan line GL2 respectively through the corresponding switch elements 24. In other words, when m is 6, six adjacent sub-pixels in the same sub-pixel row may be electrically connected to one of the scan lines of the corresponding scan line pair, and the other six sub-pixels adjacent to the six sub-pixels may be electrically connected to the other one of the scan lines of the corresponding scan line pair, and so on. In the variant embodiment of FIG. 2B, electrical connection structures of other sub-pixel rows (e.g., the sub-pixel row R2, the sub-pixel row R3, and the sub-pixel row R4) and the corresponding scan line pairs (e.g., the scan line GL3 and the scan line GL4, the scan line GL5 and the scan line GL6, and the scan line GL7 and the scan line GL8) may be the same as the electrical connection structure of the sub-pixel row R1 and the corresponding scan line pair, but are not limited thereto. Other parts of the substrate structure 20*b* of this variant embodiment may be the same as or similar to the above-mentioned substrate structure 20*a* of FIG. 2A and will not be described in detail here.

In the variant embodiment of FIG. 2B, the data signal ST1, the data signal ST2, the data signal ST3, the data signal ST4, the data signal ST5, and the data signal ST6 respectively provided by the output channel T1 to the output channel T6 of the data driver may refer to FIG. 3. The order of turning on the scan lines (e.g., turning on the scan line GL1, the scan line GL2, the scan line GL3, and the scan line GL4 in sequence) may be along the scanning direction SDR, and according to the timing of the data signal ST1, the voltage levels are sequentially provided to the sub-pixel R11 of the sub-pixel row R1, the sub-pixel R21 of the sub-pixel row R1, the sub-pixel R11 of the sub-pixel row R2, the sub-pixel R21 of the sub-pixel row R2, etc., so that the order of providing the data signal ST1 corresponding to the output channel T1 to the sub-pixels R11 and the sub-pixels R21 may be, for example, in a zigzag shape but is not limited thereto. In this case, the voltage levels of the data signal ST1 at different times may also correspond to the sub-pixels for providing light of the first color R. Similarly, the data signal ST2, the data signal ST3, the data signal ST4, the data signal ST5, and the data signal ST6 may also provide voltages respectively to the corresponding sub-pixels in a zigzag-shaped order.

In some embodiments, the electrical structure of the sub-pixel row R2 and the corresponding scan line pair may be symmetrical to the electrical structure of the sub-pixel row R1 and the corresponding scan line pair with respect to the scan line GL2 (or the scan line GL3) extending along the first direction DR1. In this case, the output channel T1 may provide the data signal ST1 sequentially to the sub-pixel R11 of the sub-pixel row R1, the sub-pixel R21 of the sub-pixel row R1, the sub-pixel R21 of the sub-pixel row R2, the sub-pixel R11 of the sub-pixel row R2, etc., such that the order of providing the data signal ST1 to the sub-pixels R11 and the sub-pixels R21 may, for example, be in a serpentine shape but is not limited thereto. Similarly, the data signal ST2, the data signal ST3, the data signal ST4, the data signal ST5, and the data signal ST6 may also provide voltages to corresponding sub-pixels in a serpentine-shaped order, respectively.

Figure 4:
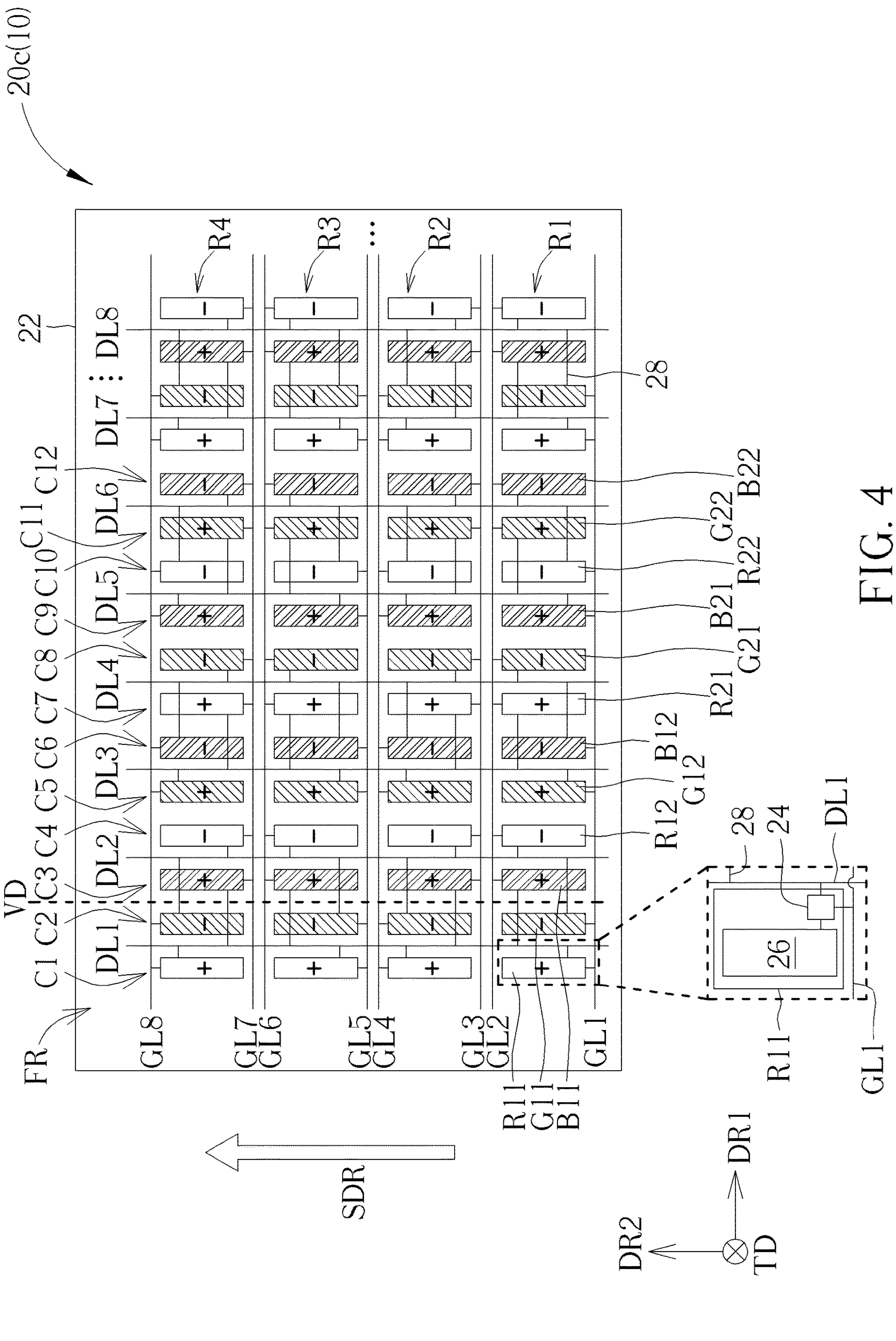
FIG. 4 schematically illustrates a top view of a display panel according to a second embodiment of the present disclosure.

Refer to FIG. 4, which schematically illustrates a top view of a display panel according to a second embodiment of the present disclosure. As shown in FIG. 4, the display panel 10 of this embodiment may include a substrate structure 20*c*, and the substrate structure 20*c* may include a substrate 22, a first electrode, a second electrode, a third electrode, and a signal line (e.g., the data line DL1). The substrate 22 may include the functional region FR as mentioned above and will not be repeated here. In some embodiments, the substrate 22 may further have a peripheral region (e.g., the peripheral region PR shown in FIG. 2A or FIG. 2B), and the peripheral region may be adjacent to the functional region FR and used for disposing peripheral circuits. The first electrode, the third electrode and the second electrode may be disposed on the substrate 22 and arranged along the first direction DR1. The signal line may be disposed on the substrate 22 and extend along the second direction DR2 perpendicular to the first direction DR1, in which the signal line may be electrically connected to the first electrode and the second electrode. Furthermore, the first electrode and the second electrode are disposed on different sides of the signal line, and the third electrode is disposed between the second electrode and the signal line. It should be noted that since the signal line may be electrically connected to the first electrode and the second electrode located on different sides of the signal line, and the second electrode is not an electrode adjacent to the signal line, the number of switching the voltage levels of the same data signal corresponding to different colors may be reduced. In this embodiment, the signal line mentioned herein may be a data line.

In the embodiment of FIG. 4, the sub-pixels may have the same arrangement and structure as the above-mentioned sub-pixels of FIG. 2A, so the sub-pixels may refer to the above description and will not be detailed redundantly. In the substrate structure 20*c* of this embodiment, the electrical connection structures of the electrodes 26 of the sub-pixels and the corresponding data lines and the number of the data lines may be different from the above-mentioned substrate structure 20*a* of FIG. 2A, and the electrical connection structure of the sub-pixels and the scan lines may be the same as the description of FIG. 2A mentioned above. Contents mentioned below will detail a portion of the substrate structure 20*c* different from the substrate structure 20*a* mentioned above, and the similarities between the substrate structure 20*c* and the substrate structure 20*a* of FIG. 2A may refer to the above-mentioned content and will not be described again. The above-mentioned signal line may refer to the data line DL1, and the above-mentioned first electrode, third electrode, and second electrode may be, for example, the electrode 26 of the sub-pixel R11, the electrode 26 of the sub-pixel G11, and the electrode 26 of the sub-pixel B11 respectively.

As shown in FIG. 4, two columns of the sub-pixels are disposed between two adjacent data lines. In this embodiment, when viewed from the top view direction TD, each sub-pixel may be defined as a region formed by two adjacent scan lines, a virtual line VD passing through a midpoint between two adjacent data lines, and one of the two adjacent data lines, and each sub-pixel includes a region of the corresponding switching element 24 and the corresponding electrode 26. In other words, the number of the sub-pixel columns may be greater than the number of the data lines. For example, the number of sub-pixel columns may be twice the number of the data lines but is not limited thereto. For example, the electrodes 26 of the sub-pixels G11 of the second column C2 and the sub-pixels B11 of the third column C3 are disposed between the data line DL1 and the data line DL2, the electrodes 26 of the sub-pixels R12 of the fourth column C4 and the electrodes 26 of the sub-pixels G12 of fifth column C5 are disposed between the data line DL3 and the data line DL4, and so on.

In FIG. 4, the data line DL1 may be electrically connected to the electrodes 26 of the sub-pixels R11 in the first column C1 and the electrodes 26 of the sub-pixels B11 in the third column C3. The data line DL2 may be electrically connected to the electrodes 26 of the sub-pixels G11 in the second column C2 and the electrodes 26 of the sub-pixels R12 in the fourth column C4. The data line DL3 may be electrically connected to the electrodes 26 of the sub-pixels G12 of the fifth column C5 and the electrodes 26 of the sub-pixels R21 of the seventh column C7. The data line DL4 may be electrically connected to the electrodes 26 of the sub-pixels B12 of the sixth column C6 and the electrodes 26 of the sub-pixels G21 of the eighth column C8. The data line DL5 may be electrically connected to the electrodes 26 of the sub-pixels B21 of the ninth column C9 and the electrodes 26 of the sub-pixels G22 of the eleventh column C11. The data line DL6 may be electrically connected to the electrodes 26 of the sub-pixels R22 of the tenth column C10 and the electrodes 26 of the sub-pixels B22 of the twelfth column C12, and so on. It should be noted that the above configuration may help to reduce the number of the output channels of the data driver (e.g., the data driver 14 shown in FIG. 1). In the embodiment of FIG. 4, each data line may be electrically connected to one corresponding output channel of the data driver 14 respectively, but is not limited thereto.

It is noted that the data lines are respectively electrically connected to the electrodes of the corresponding sub-pixel columns in the functional region FR. For example, the substrate structure 20*c* may further include a plurality of traces 28 disposed on the substrate 22 in the functional region FR. One of the data lines may be electrically connected to the electrode 26 of the sub-pixel that is not adjacent to the data line through the corresponding trace 28. For example, the data line DL1 may be electrically connected to the electrode 26 of the sub-pixel B1*l* through one of the traces 28. In FIG. 4, the trace 28 may, for example, cross the sub-pixel G11 and be electrically insulated from the sub-pixel G11, but is not limited thereto. In some embodiments, the trace 28 may be disposed between the sub-pixel G11 and one of the scan lines adjacent to the sub-pixel G11 (e.g., the scan line GL2). Similarly, the electrical connection between other data lines and the electrodes of other sub-pixels may use the above electrical connection manner and will not be detailed again.

In this embodiment, since adjacent sub-pixels arranged along the second direction DR2 and electrically connected to the same data line may provide light of the same color, the vertical resolution of the display panel 10 may be optionally reduced as mentioned above, for example, by half, so as to increase the frame rate of the display panel 10. Alternatively, when the time for displaying a frame remains unchanged, the turn-on time of each scan signal may be increased to enhance charging time of the data signal, thereby reducing the image defects.

Figure 5:
FIG. 5 schematically illustrates a color timing of the data signal according to the second embodiment of the present disclosure.

Refer to FIG. 5, which schematically illustrates a color timing of the data signal according to the second embodiment of the present disclosure. As shown in FIG. 4 and FIG. 5, the output channels of the data driver may respectively provide the data signal SDL1, the data signal SDL2, the data signal SDL3, the data signal SDL4, the data signal SDL5, the data signal SDL6, the data signal SDL7, and the data signal SDL8 to the data lines DL1-DL8. For example, the order of turning on the scan lines (e.g., turning on the scan line GL1, the scan line GL2, the scan line GL3, the scan line GL4 in sequence) may be along the scanning direction SDR. According to the timing of the data signal SDL1, the data signal SDL1 may sequentially provide a voltage level of the first color R, a voltage level of the second color B, a voltage level of the second color B, and a voltage level of the first color R respectively to the electrode 26 of the sub-pixel R11 of the sub-pixel row R1, the electrode 26 of the sub-pixel B11 of the sub-pixel row R1, the electrode 26 of the sub-pixel B1*l* of the sub-pixel row R2, and the electrode 26 of the sub-pixel R11 of the sub-pixel row R2, and the data signal SDL1 may provide the voltage levels to the electrodes 26 of other sub-pixels R11 of the first column C1 and the electrodes 26 of other sub-pixels B11 of the third column C3 in a similar order to the mentioned above. Since the sub-pixel B11 of the sub-pixel row R2 is electrically connected to the scan line GL3, and the sub-pixel R11 of the sub-pixel row R2 is electrically connected to the scan line GL4, the data signal SDL1 may continuously provide the voltage levels of the second color B to the electrodes of the sub-pixels B11 in the sub-pixel row R1 and the sub-pixel row R2. Accordingly, the number of switching the voltage levels corresponding to different colors may be reduced. Moreover, similar to the timing of the above-mentioned data signal SDL1, in the timings of the data signal SDL2 and the data signal SDL3, the voltage level of the third color G, the voltage level of the first color R, the voltage level of the first color R, and the voltage level of the third color G may be sequentially provided. In the timings of the data signal SDL4 and the data signal SDL5, the voltage level of the second color B, the voltage level of the third color G, the voltage level of the third color G, and the voltage level of the second color B may be sequentially provided, and the timing of the data signal SDL6 may be the same as the timing of the data signal SDL1. According to FIG. 5, in an arbitrarily chosen block BK where 24 voltage levels are located, the number of switching colors in this embodiment may be reduced to 12 times. Also, through the rule that adjacent sub-pixels for provide light of the same color may have similar grayscale values, the configuration of the electrodes of the sub-pixels and the data lines in this embodiment may reduce the image defects, or may reduce influence of the resistances of the data lines on the image quality.

In this embodiment, the electrode 26 of the sub-pixel R11 and the electrode 26 of the sub-pixel B11 electrically connected to the data line DL1 may respectively receive the first signal (e.g., a signal of the voltage level corresponding to the first color R shown in FIG. 5) and the second signal (e.g., a signal of the voltage level corresponding to the second color B shown in FIG. 5) from the data line DL1, and the polarity of the first signal may be the same as the polarity of the second signal, such as the positive polarity + shown in FIG. 4. Since the first signal and the second signal transmitted by the same data line DL1 may have the same polarities, the voltage levels of the data signal may not have significant change in polarity inversion, thereby reducing the image defects. By analogy, the signals transmitted by the data line DL2 to the sub-pixel G11 and the sub-pixel R12 may have the same polarity, such as negative polarity—shown in FIG. 4. In some embodiments, the positive polarity + and the negative polarity—may be interchangeable with each other.

The electrical connection structure of the electrodes 26 of the sub-pixels and the data lines in the present disclosure is not limited to the mentioned above. In some embodiments, the data line DL1 may be electrically connected the electrodes 26 of the sub-pixels R11 in the first column C1 and the electrodes 26 of the sub-pixels G12 in the fifth column C5. The data line DL2 may be electrically connected to the electrodes 26 of the sub-pixels G11 in the second column C2 and the electrodes 26 of the sub-pixels B12 in the sixth column C6. The data line DL3 may be electrically connected to the electrodes 26 of the sub-pixels B11 in the third column C3 and the electrodes 26 of the sub-pixels R21 in the seventh column C7. The data line DL4 may be electrically connected to the electrodes 26 of the sub-pixels R12 in the fourth column C4 and the electrodes 26 of the sub-pixels G21 in the eighth column C8, and so on.

Figure 6:
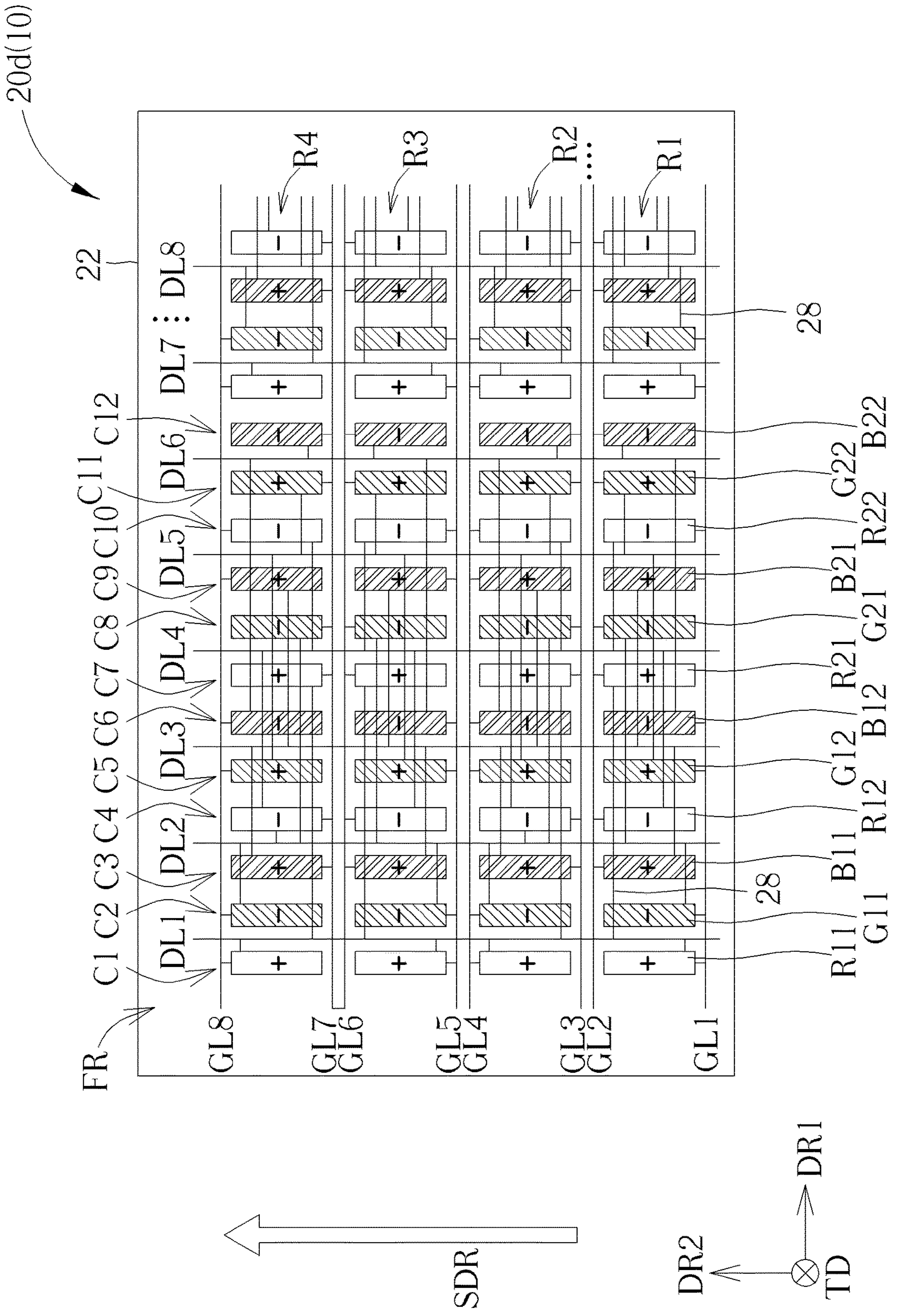
FIG. 6 schematically illustrates a top view of a display panel according to a third embodiment of the present disclosure.

Refer to FIG. 6, which schematically illustrates a top view of a display panel according to a third embodiment of the present disclosure. As shown in FIG. 6, the substrate structure 20*d* of this embodiment differs from the substrate structure 20*c* shown in FIG. 4 in that each data line may be electrically connected to the sub-pixel columns for providing light of the same color different from the sub-pixel columns shown in FIG. 4. Specifically, the data line DL1 may be electrically connected to the electrodes of the sub-pixels R11 in the first column C1 and the electrodes of the sub-pixels R21 in the seventh column C7. The data line DL2 may be electrically connected to the electrodes of the sub-pixels G11 in the second column C2 and the electrodes of the sub-pixels G21 in the eighth column C8. The data line DL3 may be electrically connected to the electrodes of the sub-pixels B11 in the third column C3 and the electrodes of the sub-pixels B21 in the ninth column C9. The data line DL4 may be electrically connected to the electrodes of the sub-pixels R12 in the fourth column C4 and the electrodes of the sub-pixel R22 in the tenth column C10. The data line DL5 may be electrically connected to the electrodes of the sub-pixels G12 in the fifth column C5 and the electrodes of the sub-pixels G22 in the eleventh column C11. The data line DL6 may be electrically connected to the electrodes of the sub-pixels B12 in the sixth column C6 and the electrodes of sub-pixels B22 in the twelfth column C12, and so on. It is noted that since the same data line is electrically connected to the electrodes of sub-pixels for providing light of the same color, the voltage levels of the data signal corresponding to different scan signals may correspond to the same color, thereby reducing the image defects or reducing the influence of the resistance of the data line on the image quality. In some embodiments, the substrate structure 20*d* may further include the traces 28 shown in FIG. 4, which will not be described in detail here.

In this embodiment, since adjacent sub-pixels arranged along the second direction DR2 and electrically connected to the same data line may provide light of the same color, the vertical resolution of the display panel 10 may be optionally reduced to increase the frame rate of the display panel 10. Alternatively, when the time for display a frame remains unchanged, the turn-on time of each scan signal may be increased, thereby reducing the image defects.

Figure 7:
FIG. 7 schematically illustrates a color timing of the data signal according to the third embodiment of the present disclosure.

Refer to FIG. 7, which schematically illustrates a color timing of the data signal according to the third embodiment of the present disclosure. As shown in FIG. 6 and FIG. 7, the output channels of the data driver may provide data signals SDL1-SDL8 to the data lines DL1-DL8 respectively. According to the scanning direction SDR, since the data line DL1 is electrically connected to the sub-pixel R11 and the sub-pixel R21 that provide light of the same color, all colors corresponding to the data signal SDL1 of the data line DL1 are the first color R, and the data signal SDL1 has no voltage levels corresponding to different colors need to be switched. The data line DL2 is electrically connected to the sub-pixel G11 and the sub-pixel G21 that provide light of the same color, all colors corresponding to the data signal SDL2 of the data line DL2 are the third color G, and the data signal SDL2 has no voltage levels corresponding to different colors need to be switched. The data line DL3 is electrically connected to the sub-pixel B11 and the sub-pixel B21 that provide light of the same color, all colors corresponding to the data signal SDL3 of the data line DL3 are the second color B, and the data signal SDL3 has no voltage levels corresponding to different colors need to be switched, and so on. By analogy, all the data line DL4 to the data line DL8 have no voltage levels corresponding to different colors need to be switched. Therefore, the adjacent voltage levels of the data signals SDL1-SDL8 are less likely to change significantly, thereby reducing the image defects. Alternatively, the influence of the resistance of the data lines on the image quality may be reduced.

In this embodiment, the electrode of the sub-pixel R11 and the electrode of the sub-pixel R21 electrically connected to the data line DL1 may respectively receive the first signal (e.g., a signal of the voltage level corresponding to a first one of the first colors R shown in FIG. 7) and a second signal (e.g., a signal of the voltage level corresponding to a second one of the first colors R shown in FIG. 7) from the data line DL1, and the polarity of the first signal may be the same as the polarity of the second signal, such as the positive polarity + shown in FIG. 6. The signals transmitted by the data line DL2 to the sub-pixel G11 and the sub-pixel G21 may have the same polarity, such as negative polarity—as shown in FIG. 6. By analogy, the polarities transmitted by each data line to the sub-pixels in different columns may be the same as each other. Since the signals transmitted by the same data line may have the same polarities, the voltage levels of the data signal may not change significantly due to polarity inversion, thereby reducing the image defects. In some embodiments, the positive polarity + and the negative polarity—may be interchangeable with each other.

In summary, in the substrate structure of the present disclosure, the electrodes of the sub-pixels in the same column correspond to the same color, and the data lines electrically connected to the electrodes of different columns may be electrically connected to each other, or the data lines may be electrically connected to the electrodes of two non-adjacent columns, so that the number of switching the voltage levels of one data signal corresponding to different colors may be reduced, or the data signal has no voltage levels corresponding to different colors need to be switched. Moreover, through the general rule that adjacent sub-pixels for provide light of the same color may have similar gray-scale values, the difference between adjacent voltage levels of the data signal may be reduced, thereby decreasing the image defects or reducing influence of the resistance of the data line on the image quality. In addition, the signals of the same output channel of the data driver or the same data line corresponding to different sub-pixels may have the same polarity, so that the voltage levels of the data signal will not have a significant difference in polarity inversion, thereby reducing the image defects. Furthermore, since adjacent sub-pixels arranged along the extending direction of the data line and electrically connected to the same data line may provide light of the same color, the vertical resolution of the display panel may be optionally reduced by transmitting one scan signal to two scan lines electrically connected to the adjacent sub-pixels, so as to increase the frame rate or the charging time of the data signal.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A substrate structure, comprising:

a substrate comprising a functional region and a peripheral region, wherein the peripheral region is adjacent to the functional region;

a first electrode and a second electrode disposed on the substrate and arranged along a first direction, wherein the first electrode and the second electrode are disposed in the functional region;

a first switching element;

a second switching element;

a first signal line and a second signal line arranged on the substrate along the first direction and extending along a second direction perpendicular to the first direction, wherein the first signal line is electrically connected to the first electrode, the second signal line is electrically connected to the second electrode, and the first signal line and the second signal line are disposed in the functional region and extend to the peripheral region;

a third signal line; and a fourth signal line;

wherein the third signal line and the fourth signal line are arranged on the substrate along the second direction and extend along the first direction, the first electrode and the second electrode are disposed between the third signal line and the fourth signal line, the third signal line is electrically connected to the first electrode through the first switching element, and the fourth signal line is electrically connected to the second electrode through the second switching element;

wherein the first signal line and the second signal line are electrically connected to each other in the peripheral region.

2. The substrate structure as claimed in claim 1, wherein the first electrode receives a first signal from the first signal line, the second electrode receives a second signal from the second signal line, and a polarity of the first signal is the same as a polarity of the second signal.

3. The substrate structure as claimed in claim 1, wherein the first signal line and second signal line are used for transmitting data signals, and the third signal line and the fourth signal line are used for transmitting scan signals.

4. The substrate structure as claimed in claim 1, further comprising a third electrode disposed on the substrate, wherein the third electrode is disposed between the first electrode and the second electrode and disposed between the third signal line and the fourth signal line.

5. The substrate structure as claimed in claim 4, further comprising a third switching element, wherein the third signal line is electrically connected to the third electrode through the third switching element.

6. The substrate structure as claimed in claim 1, wherein the first electrode is included in a first sub-pixel, the second electrode is included in a second sub-pixel, and the first sub-pixel and the second sub-pixel are used for providing light of a same color.

7. The substrate structure as claimed in claim 1, further comprising a fourth electrode disposed on the substrate, wherein the first electrode and the fourth electrode are arranged along the second direction and electrically connected to the first signal line.

8. The substrate structure as claimed in claim 7, wherein the first electrode receives a first signal from the first signal line, the fourth electrode receives another first signal from the first signal line, and a polarity of the first signal is the same as a polarity of the another first signal.

9. The substrate structure as claimed in claim 7, wherein the first electrode is included in a first sub-pixel, the fourth electrode is included in a third sub-pixel, and the first sub-pixel and the third sub-pixel are used for providing light of a same color.

10. A substrate structure, comprising:

a substrate;

a first electrode, a second electrode, and a third electrode, wherein the first electrode, the third electrode, and the second electrode are disposed on the substrate and arranged along a first direction;

a fourth electrode disposed on the substrate;

a first switching element;

a second switching element;

a first signal line disposed on the substrate and extending along a second direction perpendicular to the first direction, wherein the first signal line is electrically connected to the first electrode and the second electrode;

a third signal line; and a fourth signal line;

wherein the third signal line and the fourth signal line are arranged on the substrate along the second direction and extend along the first direction, the first electrode, the second electrode, and the third electrode are disposed between the third signal line and the fourth signal line, the third signal line is electrically connected to the first electrode through the first switching element, and the third signal line is electrically connected to the third electrode through the second switching element;

wherein the first electrode and the second electrode are disposed on different sides of the first signal line, and the third electrode is disposed between the second electrode and the first signal line;

wherein the first electrode and the fourth electrode are arranged along the second direction and electrically connected to the first signal line, and the fourth electrode is adjacent to the first electrode.

11. The substrate structure as claimed in claim 10, further comprising a second signal line disposed on the substrate, wherein the third electrode is disposed between the first signal line and the second signal line.

12. The substrate structure as claimed in claim 11, wherein the second signal line is electrically connected to the third electrode.

13. The substrate structure as claimed in claim 10, further comprising a third switching element, wherein the fourth signal line is electrically connected to the second electrode through the third switching element.

14. The substrate structure as claimed in claim 10, wherein the first signal is used for transmitting a data signal, and the third signal line and the fourth signal line are used for transmitting scan signals.

15. The substrate structure as claimed in claim 10, wherein the first electrode receives a first signal from the first signal line, the second electrode receives a second signal from the first signal line, and a polarity of the first signal is the same as a polarity of the second signal.

16. The substrate structure as claimed in claim 10, wherein the first electrode is included in a first sub-pixel, the second electrode is included in a second sub-pixel, the third electrode is included in a third sub-pixel, and the first sub-pixel, the second sub-pixel, and the third sub-pixel are used for providing light of different colors.

17. The substrate structure as claimed in claim 10, wherein the first electrode receives a first signal from the first signal line, the fourth electrode receives another first signal from the first signal line, and a polarity of the first signal is the same as a polarity of the another first signal.

* * * * *